United States Patent [19]
Campbell, Jr. et al.

[11] 3,782,211
[45] Jan. 1, 1974

[54] MULTIPLE GROOVE PULLEY CONSTRUCTION

[75] Inventors: James D. Campbell, Jr., Lombard; Joseph E. Maurey, Chicago, both of Ill.

[73] Assignee: Maurey Manufacturing Corporation, Chicago, Ill.

[22] Filed: Feb. 9, 1972

[21] Appl. No.: 224,817

[52] U.S. Cl. .......................................... 74/230.17 C
[51] Int. Cl. ............................................. F16h 55/52
[58] Field of Search .................. 74/230.17 C, 230.3, 74/230.11, 230.13, 230.17 A

[56] References Cited
UNITED STATES PATENTS

| | | | |
|---|---|---|---|
| 2,889,161 | 6/1959 | Powell et al. | 74/230.17 C |
| 2,262,197 | 11/1941 | Otto | 74/230.17 C |
| 2,400,294 | 5/1946 | Firth | 74/230.17 C |
| 2,657,584 | 11/1953 | Williams | 74/230.17 C |

*Primary Examiner*—Charles J. Myhre
*Assistant Examiner*—R. H. Lazarus
*Attorney*—McDougall, Hersh & Scott

[57] ABSTRACT

An adjustable pulley construction of the type having a plurality of flange members associated in pairs and mounted on a shaft. The respective pairs each define a bolt receiving groove, and one flange member of a pair is tied to a corresponding flange member of every other pair whereby the flange members are divided into first and second sets. The outermost pair of flange members is located beyond the end of the shaft, and a screw is associated with this pair of flange members and aligned coaxially with the shaft. Rotation of the screw operates to change the relative positions of the associated flange members. The means tying the sets of flange members together provide for simultaneous adjustment of all pulley grooves.

7 Claims, 6 Drawing Figures

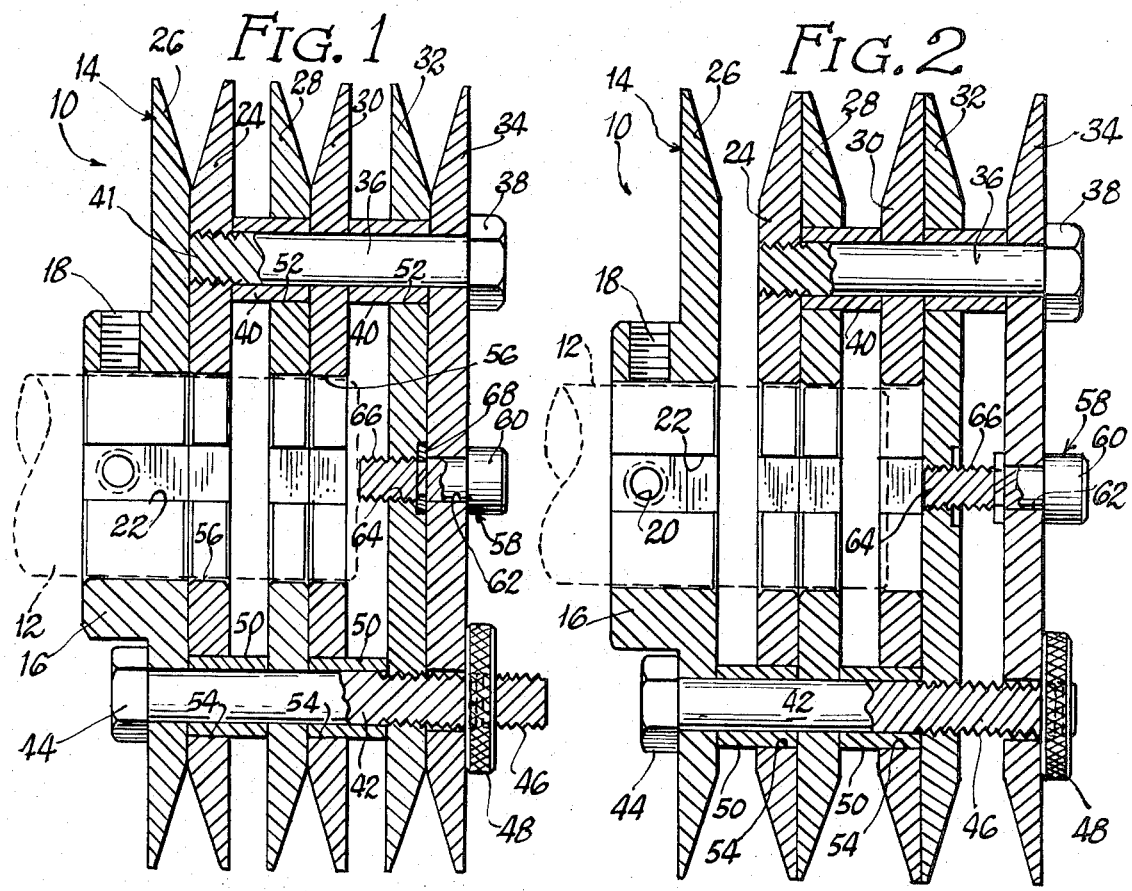
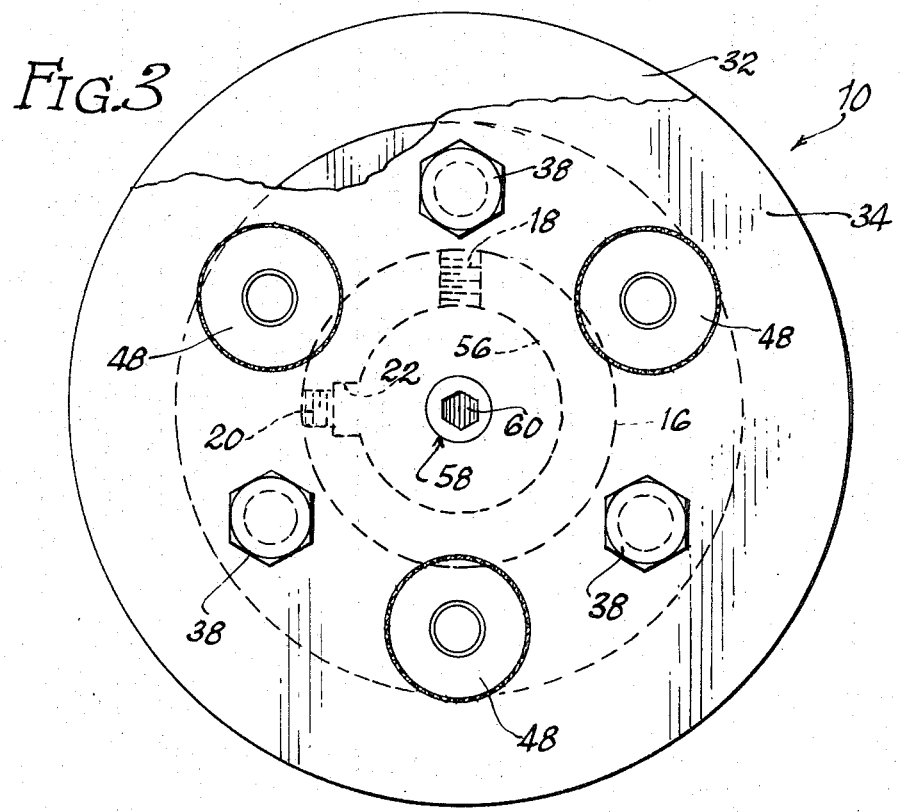

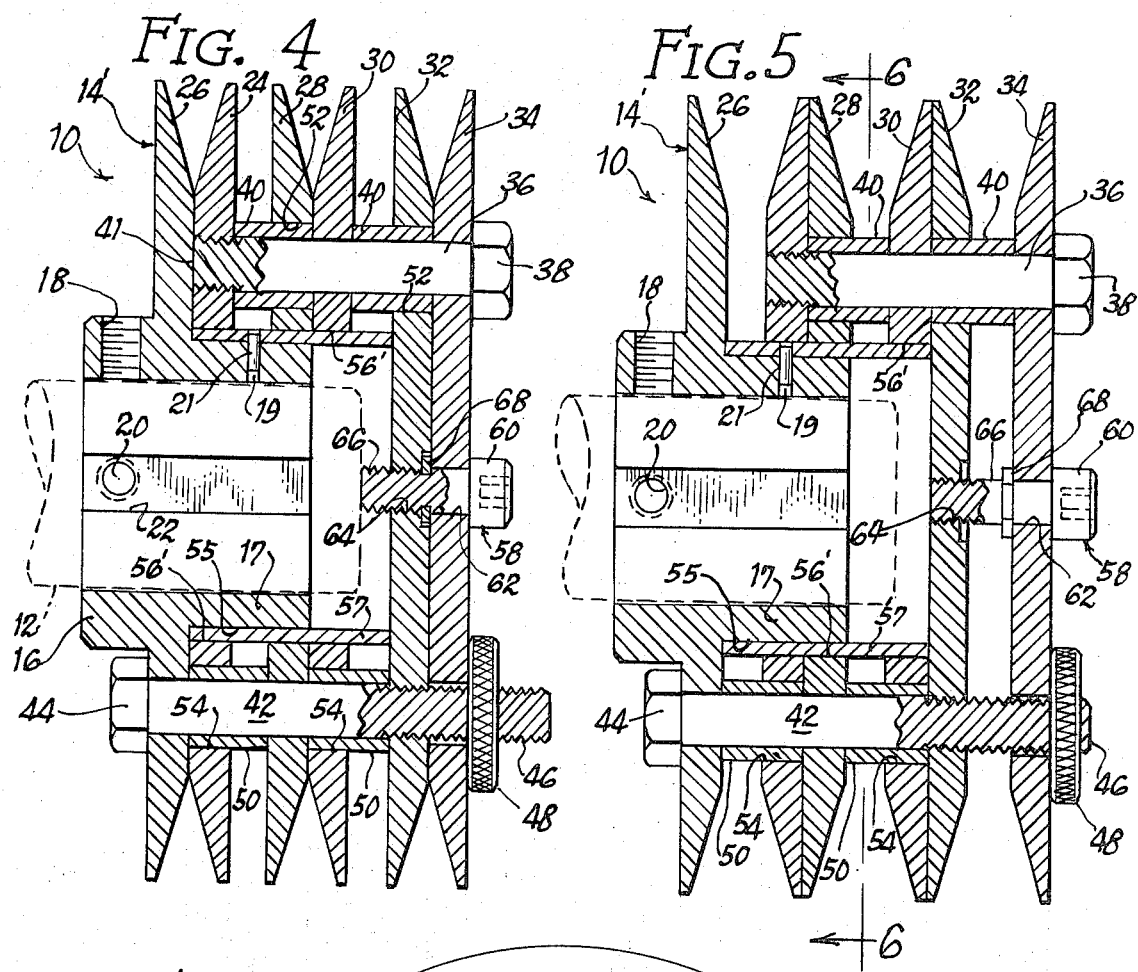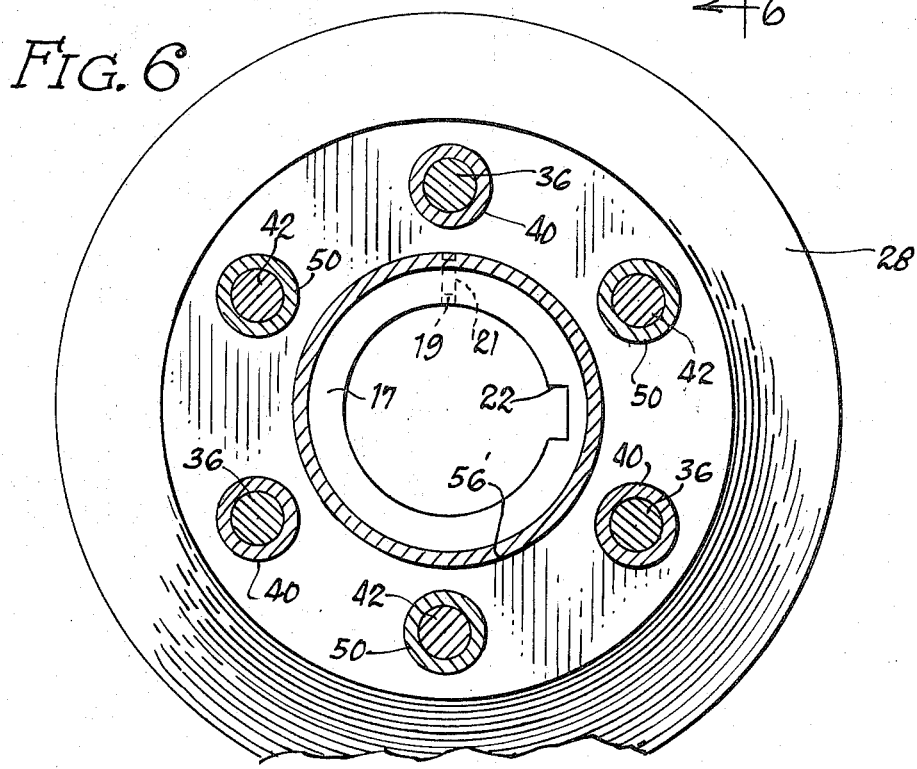

MULTIPLE GROOVE PULLEY CONSTRUCTION

The construction of this invention comprises an adjustable pulley having multiple grooves whereby several pulley belts can be associated therewith. The invention is particularly concerned with a pulley construction of the type including means for changing the pulley groove spacing with all the changes being made in unison.

Adjustable pulleys of the type contemplated are used in many applications involving mounting of the pulleys on the shafts of drive motors and other shafts whereby the output of the motors can be utilized. In an increasing number of applications including industrial heating and cooling systems, relatively high horsepower motors are being employed. In such systems and in other applications, relatively large structures such as fans must be driven, and these require pulley systems developing greater than 10 horsepower. Pulleys with two or more grooves are often used in such applications.

When an installation is made employing multiple groove pulleys, it is necessary to set the spacing of the pulley grooves in order to control the operation of the constructions to be driven with the pulley mechanisms. For example, in large air moving systems, a certain fan speed will provide the best operating conditions, and this speed will, of course, vary from one installation to another depending upon the duct design, the requirements of the user, and other factors. The simplest way to provide for variations in speed is to provide an adjustable pulley construction. Thus, if the grooves can be varied, then one pulley can be mounted on a shaft and adjusted until the desired operation is achieved. Without the adjustable pulley, it would be necessary to secure an inventory of pulleys having different groove sizes, and to change to different sizes until a suitable size was found.

In addition to providing adjustability, the pulley construction must be sufficiently strong and reliable to operate under the conditions referred to. Thus, the pulley must be able to withstand extended use under conditions requiring as much as 100 horsepower output, depending on the number of grooves in the pulley, and the adjustment made must be stable so that the operating conditions will not vary throughout the life of the pulley construction.

It is a general object of this invention to provide an improved adjustable pulley construction.

It is a more specific object of this invention to provide an adjustable pulley construction which is easy to install and adjust whereby desired operating conditions can be achieved with a minimum of effort and expense.

It is a still further object of this invention to provide a pulley construction which is sufficiently strong to withstand extended operation even under heavy load conditions, and which is stable whereby the groove spacing at which the pulley is set will be retained through the life of the pulley operation.

These and other objects of this invention will appear hereinafter and for purposes of illustration, but not of limitation, specific embodiments of the invention are shown in the accompanying drawings in which:

FIG. 1 is a vertical, sectional view of the adjustable pulley construction characterized by the features of this invention and illustrated with minimum spacing between pulley grooves;

FIG. 2 is a vertical, sectional view of the pulley construction illustrated with maximum spacing of the pulley grooves;

FIG. 3 is an end elevational view, partly cut away, illustrating the pulley construction;

FIG. 4 is a vertical, sectional view of an alternative form of adjustable pulley construction characterized by the features of this invention and illustrated with minimum spacing between pulley grooves;

FIG. 5 is a vertical, sectional view of the pulley construction of FIG. 4 illustrated with maximum spacing of the pulley grooves; and, FIG. 6 is an end elevational view, partly cut away, illustrating the pulley construction of FIG. 4.

The adjustable pulley construction of this invention generally comprises a plurality of axially aligned flange members mounted on a shaft. The flange members are divided into respective pairs with each pair defining a pulley belt receiving groove. One flange member of each pair is included in a set of flange members adapted to move in unison relative to the other flange members of each pair. These other flange members are also tied together whereby the spacing between the other flange members remains constant.

The particular improvements of the invention relate to the manner of mounting the pulley construction on a shaft and to the manner of achieving adjustment of the groove spacing. Specifically, the pulley construction is mounted so that at least the outermost pair of flange members is positioned beyond the end of the shaft. The remaining pairs of flange members define central openings whereby these members are positioned around the shaft. The assembly of the respective pairs is held together by means of tie rods or bolts with one type of tying means securing the flange members of one set in an assembly and another type of tie means securing the other set of flange members in an assembly.

The adjusting means comprises a screw which is preferably mounted co-axially with the shaft axis. This screw is associated with the outermost pair of flange members, and the screw is secured for free rotation relative to one of the flange members in this outermost pair. A threaded portion of the screw is received in a threaded opening of this outermost pair. Turning of the screw, therefore, serves to adjust the relative spacing between the flange members of the outermost pair, and due to the tying means, each flange member of a given set is moved relative to each flange member of the other set. The tying means includes an elongated bolt, and adjusting nuts attached to the bolt. These nuts can be loosened to free the movable set of flange members relative to the other set and can be tightened to secure the respective sets in a desired position.

FIGS. 1–3 illustrate a pulley construction 10 mounted on a shaft 12. The pulley construction includes an inner flange member 14 having a hub portion 16. The hub portion includes a first threaded opening 18 for receiving a set screw, and a second threaded opening 20 also designed for receiving a set screw.

In assembling the pulley construction on a shaft, the opening 18 may be located opposite a flat area defined by the shaft whereby the set screw can be held firmly against the flat area thereby preventing rotary or axial movement of the construction relative to the shaft. Alternatively, or in addition, the shaft may be provided with an outwardly extending key which can be received by the keyway 22. The end of the opening 20 communicates with this keyway whereby a set screw in this opening, when driven firmly against the shaft key, will prevent axial movement of the pulley construction with the combination of the key and keyway preventing rotary movement.

The flange member 14 is located adjacent a flange member 24 with the respective flange members defining a belt receiving groove 26. Additional pairs of flange members 28 and 30 and 32 and 34 are associated with the flange members 14 and 24. Each pair of flange members defines a separate belt receiving groove.

The flange members are divided into respective sets to facilitate adjustment of the spacing between the flange members. Tying means in the form of rods or bolts 36 having heads 38 are employed for securing the flange members 24, 30 and 34 in an assembly. Tubular spacers 40 are mounted between the members 23, 30 and 34 to retain a constant spacing between these members. The bolt 36 defines a threaded end 41 which is received in a threaded opening defined by the flange member 24, and the bolt 36 is maintained in a fixed position relative to these flange members during use of the construction.

A similar arrangement including tie rods or bolts 42 is employed for securing the flange members 13, 28 and 32 in an assembly. These bolts include a head 44 and a threaded end 46 which is received in a threaded opening defined by the flange member 32, and this secures the three members 14, 28 and 32 in an assembly. Tubular spacers 50 are positioned between the flange members 14, 28 and 32 with the length of the spacers determining the spacing between these flange members.

The flange member 34 defines a clearance opening for the threaded end 46 to permit relative movement between this flange member and the threaded end. Knurled nuts 48 are located for engagement with the face of the flange 34 for tightening against this face when the desired relationship of the flange members is achieved. These nuts are loosened during adjustment of the flange members, this adjustment being carried out in the manner to be described.

In each instance, the tubular spacers 40 and 50 have an outer diameter dimensioned to be received in openings 52 and 54, respectively, of adjacent flange members. These openings provide clearance to thereby permit relative movement of flange members in the manner to be described.

The outermost pair of flange members comprising the members 42 and 44 are located beyond the end of the shaft 12. On the other hand, the inner flange members define openings 56 which are dimensioned to receive the shaft 12 whereby these flange members are positioned around the shaft.

A screw 58 having a head 60 is associated with the outermost pair of flange members 32 and 34. The outer flange member 34 defines a central clearance opening 62 which receives the screw 38. The inner flange member 32 of the pair receives a threaded end 66 of the screw into threaded opening 64. A retaining washer 68 is secured around the shank of the screw whereby the screw is held in a fixed position relative to the flange member 34. The screw is, however, free to rotate relative to this flange member.

As suggested by FIGS. 1 and 2, the pulley construction can be adjusted between two extreme positions. In FIG. 1, the spacing for a belt is at a minimum while the maximum spacing for the construction is shown in FIG. 2.

To accomplish adjustment between the positions shown in FIGS. 1 and 2, the user of the construction rotates the screw 58. With reference to FIG. 1, this rotation is preceded by loosening of the nuts 48 whereby the nuts can be backed away from the outermost flange member 34. When the screw 58 is then rotated, this will back the screw out of the threaded opening 64, and the flange member 34 will move to the right since it is tied to the screw. It will be noted that the position of the flange member 32 remains constant relative to the end of the shaft 12 due to the fact that flange member 26 is tied to the shaft 12.

As the flange member 34 moves with the screw 58, the entire assembly including the bolt 36, tubular spacers 40, and flange members 30 and 24 will also move. It will be noted that these flange members will ride over the surfaces of the tubular spacers 50 while the spacer 40 moves within the openings 52 defined by the flange members 28 and 32. An arrangement where tubular spacers are included in an assembly including flange members is illustrated in Williams U.S. Pat. No. 3,200,660.

FIGS. 4 through 6 illustrate a modified form of the invention. In this instance, the flange 14' includes a second hub portion 17 which extends inwardly of the assembly. This hub portion thus provides a substantial area of engagement with the shaft 12.

A tubular sleeve 57 extends over the hub portion 17 and is preferably press-fitted with respect to the outer surface 55 of this hub portion. The inner surfaces 56' of the flange members 24 and 30 extend around the outer surface of the tubular sleeve for movement over this surface. A locking pin 21 is press-fitted in aligned openings defined by the tubular sleeve and hub portion 17 to provide further securing of the sleeve relative to the hub portion.

The arrangement of FIGS. 4 through 6 provides some additional support for the assembly and is particularly useful for embodiments including several grooves, for example five or six grooves.

It will be appreciated that the arrangements described operate in an extremely efficient manner whereby an adjustable pulley construction can be manufactured and utilized with a minimum of effort and expense. Installation of the pulley construction is, of course, quite simple in that it is merely located on the end of a shaft. As illustrated in FIGS. 1 and 4, the constructions may be installed by first locating the end flange members 32 and 34 in engagement with minimum spacing then being provided for the belts. The assembly is then located on the shaft 12 with the end of the screw 58 abutting the end of the shaft. After the set screws are employed for securing the assembly on the shaft, the nuts 48 can be loosened, and the screw 58 operated until the desired spacing is achieved.

The arrangement of the invention may be designed so that one revolution of the adjusting screw 58 will result in a specific change in pitch diameter. For example, by selecting a particular thread size for the adjusting screw and a particular groove angle, a fixed variation in such diameter can be accomplished with each revolution of the screw. This provides a highly convenient arrangement since the alternative would be to employ calipers for periodically measuring the OD of the belt until a desired pitch diameter had been achieved.

The screws 58 are tightened once the desired spacing is located, and this provides a means for securely fixing the spacing whereby the spacing will not vary during use of the pulley. In addition, the provision of the screws 48 takes the burden away from the adjusting screw 58 so that this screw does not have any heavy stress applied for maintaining the desired spacing.

The location of the adjusting screw co-axially with the shaft 12 is another important consideration. This adjusting screw will provide for even variations in spacing all around the periphery of the flange pairs. Thus, with certain prior art constructions, the off-center location of adjusting means has led to canting or uneven positioning of flange members whereby operating difficulties are experienced. It has been found that applicant can locate the outermost flange pair in the off-the-shaft position illustrated without sacrificing stability during pulley operation while at the same time greatly increasing the reliability of the adjustment.

It will be understood that various changes and modifications may be made in the above described construction which provide the characteristics of the invention without departing from the spirit thereof.

That which is claimed is:

1. In an adjustable pulley construction wherein a plurality of axially aligned flange members are mounted on a shaft, said flange members being divided into at least two pairs of flange members with the members of each pair defining a belt receiving groove, at least one member of each pair being axially movable relative to the other member, the flange members being divided into a first set consisting of said movable members and a second set consisting of the other members, and means tying the members of a set together whereby the size of the respective grooves can be changed in unison, the improvement wherein the outer pair of said flange members is located beyond the end of said shaft, at least some of the other flange members defining central openings whereby at least some of the remaining pairs of flange members are positioned around said shaft, and means for moving said first set of flange members relative to said second set comprising a screw associated with said outer pair of flange members, said screw being independent of said means tying the members of a set together, and said screw being threaded into at least one flange member of said outer pair and engaging the other flange member of said outer pair whereby rotation of the screw will move the flange members of said outer pair relative to each other while simultaneously achieving relative movement of the flange members of the remaining pairs.

2. A construction in accordance with claim 1 wherein the axis of said screw is substantially in line with the axis of said shaft.

3. A construction in accordance with claim 2 including an opening defined by the outermost flange member of said outer pair, said opening receiving said screw for free rotation of the screw therein, means securing the screw relative to said outermost flange member whereby said screw rotates without movement relative to said outermost flange member, and a threaded member in the other flange member of said outer pair receiving said screw whereby relative movement of the flange members of said outer pair will occur upon rotation of the screw.

4. A construction in accordance with claim 6 wherein said adjusting nuts are positioned on the outside face of the outermost flange member whereby the adjusting nuts are accessible for making changes in the groove sizes.

5. A construction in accordance with claim 1 wherein said screw is provided with threads of a predetermined dimension, rotation of the screw through one revolution providing a predetermined amount of relative axial movement between the flange members of each pair.

6. In an adjustable pulley construction wherein a plurality of axially aligned flange members are mounted on a shaft, said flange members being divided into at least two pairs of flange members with the members of each pair defining a belt receiving groove, at least one member of each pair being axially movable relative to the other member, the flange members being divided into a first set consisting of said movable members and a second set consisting of the other members, and means tying the members of a set together whereby the size of the respective grooves can be changed in unison, the improvement wherein the outer pair of said flange members is located beyond the end of said shaft, at least some of the other flange members defining central openings whereby at least some of the remaining pairs of flange members are positioned around said shaft, and means for moving said first set of flange members relative to said second set comprising a screw associated with said outer pair of flange members, said screw being threaded into at least one flange member of said outer pair and engaging the other flange member of said outer pair whereby rotation of the screw will move the flange members of said outer pair relative to each other while simultaneously achieving relative movement of the flange members of the remaining pairs, wherein the means tying the flange members of a set together comprise bolt means, and tubular spacers mounted on the bolt shanks and disposed between the flange members of a set for thereby retaining the flange members of a set in permanent spaced-apart relationship, the bolt means for said first set being elongated, adjusting nuts for said first set bolt means, rotation of the adjusting nuts in one direction freeing said first set for movement relative to said second set in response to rotation of said screw, and rotation of said nuts in the opposite direction operating to fix said first set in position relative to said second set.

7. In an adjustable pulley construction wherein a plurality of axially aligned flange members are mounted on a shaft, said flange members being divided into at least two pairs of flange members with the members of each pair defining a belt receiving groove, at least one member of each pair being axially movable relative to the other member, the flange members being divided into a first set consisting of said movable members and a second set consisting of the other members, and means tying the members of a set together whereby the size of the respective grooves can be changed in unison, the improvement wherein the outer pair of said flange members is located beyond the end of said shaft, the other flange members defining central openings, the inner flange member including a first hub portion and means for securing said first hub portion to said shaft, a second, oppositely extending, hub portion on said inner flange member, and a tubular sleeve secured to said second hub portion, the flange members other than said outer pair of flange members being positioned around said tubular sleeve, and means for moving said first set of flange members relative to said second set comprising a screw associated with said outer pair of flange members, said screw being threaded into at least one flange member of said outer pair and engaging the other flange member of said outer pair whereby rotation of the screw will move the flange members of said outer pair relative to each other while simultaneously achieving relative movement of the flange members of the remaining pairs.

* * * * *